United States Patent [19]

Janning

[11] 3,934,690
[45] Jan. 27, 1976

[54] MAGNETIC SPRING CLUTCH
[75] Inventor: John L. Janning, Dayton, Ohio
[73] Assignee: NCR Corporation, Dayton, Ohio
[22] Filed: Dec. 4, 1974
[21] Appl. No.: 529,316

[52] U.S. Cl. .............................. 192/84 T; 192/81
[51] Int. Cl.² ......................................... F16D 19/00
[58] Field of Search .......... 192/84 T, 84 PM, 81 C, 192/26, 37

[56] References Cited
UNITED STATES PATENTS

| | | | |
|---|---|---|---|
| 2,832,918 | 4/1958 | Pierce | 192/84 PM |
| 3,062,345 | 11/1962 | Cruzen | 192/26 |
| 3,171,523 | 3/1965 | Shoquist | 192/84 T |
| 3,177,996 | 4/1965 | Bates | 192/84 T |
| 3,349,880 | 10/1967 | Baer | 192/84 T |
| 3,394,785 | 7/1968 | Crutcher et al. | 192/26 |

Primary Examiner—Samuel Scott
Assistant Examiner—Wesley S. Ratliff, Jr.
Attorney, Agent, or Firm—J. T. Cavender; Albert L. Sessler, Jr.; Elmer Wargo

[57] ABSTRACT

A helical clutch spring has one end thereof fixed to a continuously rotating input member of the clutch, and some of the turns of the spring partially envelop a floating magnetic ring secured to a rotatable output member of the clutch. The input and output members are made of nonmagnetic material, and when the clutch's coil is energized, a magnetic flux path passing through the clutch spring and the magnetic ring causes the clutch spring to tighten on the magnetic ring to provide a driving connection between the input and the output members.

13 Claims, 7 Drawing Figures

MAGNETIC SPRING CLUTCH

BACKGROUND OF THE INVENTION

This invention relates to a magnetic spring clutch which has an improved magnetic flux path which provides for a more reliable operation of the clutch and which also has a simplified, low-cost construction.

This invention belongs to that class of clutches which has a normally, continuously-running input hub which is coupled, when the clutch is activated, to a normally, stationary, output hub. The input and output hubs are axially aligned with each other, and the clutch includes a helical spring having one end which is secured to one of the hubs and having some of the turns of the spring surrounding the remaining hub. Various means are used to cause the free end of the spring to tighten on the associated hub to provide a driving connection between the input and output hubs whenever the clutch is energized.

Some of the means for causing a clutch spring to tighten on the associated hub of a magnetic spring clutch which are representative of the prior art are shown in the following U.S. Pat. Nos.

2,976,976 which issued Mar. 28, 1961;
3,349,880 which issued Oct. 31, 1967;
3,414,100 which issued Dec. 3, 1968;
3,684,068 which issued Aug. 15, 1972; and
3,735,847 which issued May 29, 1973.

In general, the clutches shown in the above named patents utilize intermediate moveable members (like a brake shoe for example) which are acted upon by the magnetic force of a coil when the coil is energized. The intermediate member, in moving, acts upon the helical spring of the clutch causing the spring to tighten on the output hub of the clutch to provide a driving coupling between the input and output hubs.

In contrast with the above, the magnetic spring clutch of this invention does not utilize an intermediate moveable member which is magnetically actuated to act upon the clutch spring, causing it to tighten on the output hub of the clutch. This invention utilizes a floating magnetic ring (to be later defined herein) which is secured to the output hub of the clutch, and also uses a construction which concentrates the magnetic flux of its associated coil means along the length of the helical spring itself and the floating magnetic ring to provide for a reliable, quick-acting clutch of simple construction. The assignee of this application has manufactured for several years a magnetic spring clutch without an intermediate moveable member; however, this prior art clutch does not have the floating magnetic ring, the improved magnetic flux pattern, or the simplified construction of the present invention.

SUMMARY OF THE INVENTION

The magnetic spring clutch of this invention includes a frame means, a continuously rotating driving member means and an output member means mounted in axial alignment with each other in said frame means. It also includes a helical clutch spring having one end thereof secured to the driving member means and a free end. A floating magnetic ring is fixed to the output member means, and the ring is at least partially enveloped by the turns of the clutch spring. A coil means, when energized, produces a magnetic flux path which passes through the clutch spring and the magnetic ring so as to cause the clutch spring to tighten on the magnetic ring to provide a driving connection between the driving member means and the output member means.

DETAILED DESCRIPTION OF THE INVENTION

Figure 1:
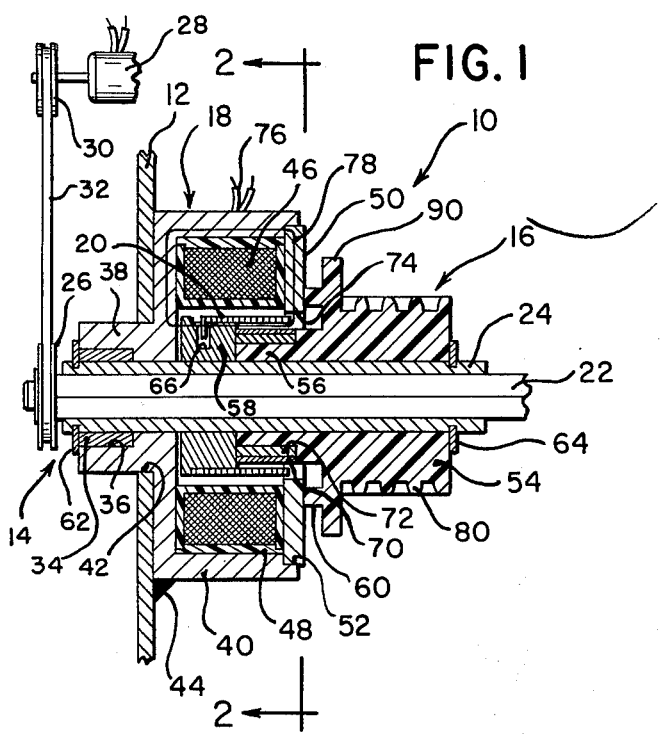
FIG. 1 is a side elevational view, partly in cross section, showing a magnetic spring clutch made in accordance with this invention, and including a driving member means, output member means with a floating magnetic ring fixed thereto, coil means, and a helical clutch spring.

FIG. 1 shows a side-elevational view of a magnetic spring clutch designated generally as 10 and made according to the teaching of this invention.

The magnetic spring clutch 10 (FIG. 1) hereinafter called clutch 10, generally includes a frame means 12, driving member means 14, output member means 16, coil means 18 and a helical clutch spring 20.

The driving member means 14 of the clutch 10 includes a driving shaft 22 of hexagonal cross section which is mounted in a tubular shaft 24 whose internal, cross-sectional shape complements that of the shaft 22 to provide a driving connection therebetween. One end of the shaft 22 has a pulley 26 fixed thereto, and the pulley 26 is drivingly connected to a motor 28 whose output pulley 30 and belt 32 rotate the pulley 26 and shafts 22 and 24 whenever the motor 28 is energized.

The tubular shaft 24 of the driving member means 14 (FIG. 1) has an outer diameter which is circular in cross section, and the shaft 24 is rotatably mounted near one end thereof in a bushing 34 which is press fitted into a matching annular recess 36 in a tubular extension 38 of the housing 40 of the coil means 18. The housing 40 is made of ferrous material and is generally cylindrical in shape, having the cross section shown in FIG. 1. The tubular extension 38 of the housing 40 passes through an opening 42 in the frame means 12, and the housing 40 is fixed to the frame means 12 by any conventional technique, such as welding, as shown at point 44. A ring type coil 46 is mounted within the housing 40 and is insulated therefrom by insulation 48. After the coil 46 is inserted in the housing 40, a thick ferrous washer 50 is used to retain the coil 46 therein by press fitting the washer 50 into an annular seat 52 formed in the open end of the housing 40.

The remaining end of the tubular shaft 24 (FIG. 1) is rotatably mounted in an output member 54 of the output member means 16. The output member 54 is made of a nonmagnetic plastic material like acetal resin which is sold under the trademark Delrin, and is manufactured by Dupont of Wilmington, Delaware. The output member 54 has a tubular extension 56 which abuts against a nonferrous sleeve 58 which is conventionally secured to the tubular shaft 24 by press fitting, cementing, or the like. The output member 54 also has a projecting reinforcing, annular rim 60 which comes close to but does not abut against the thick washer 50 when the clutch 10 is in the assembled relationship shown in FIG. 1. Suitable C-type locking washers 62 and 64, placed in complementary, annular grooves in the tubular shaft 24 prevent axial displacement of the shaft 24, secure the clutch 10 in the assembled relationship shown, and maintain the sleeve 58 and the tubular extension 56 in abutting relationship with each other to prevent a coil of spring 20 from entering therebetween.

The sleeve 58 (FIG. 1) alluded to in the previous paragraph is part of the driving member means 14. The sleeve 58 has a radially aligned hole therein into which one end of the ferrous, helically-wound, clutch spring 20 is positioned so that the spring 20 is rotated by the sleeve 58. The turns of the spring 20 have a square cross section, and the turns are wound closely to one another.

Some of the turns of the spring 20 (FIG. 1) envelop a floating magnetic ring 70 (to be later defined herein) which is fixed to the output member means 16 to rotate therewith in the following manner. The extension 56 of the output member 54 has a reduced diameter portion thereon to receive a ring 72 which is made of a nonferrous material like brass or a thin layer of ferrous material, and the ring 72 is keyed or conventionally fixed to the extension 56 to rotate therewith. The floating magnetic ring 70 is made of a thin layer of nickel, which for best results, should be at least .001 inch thick. The magnetic ring 70 is fixed to the ring 72 by conventional techniques, as for example, by plating the layer of nickel on the ring 72. In the embodiment shown, the outer diameter of the magnetic ring 70 is the same as the exposed outer diameter of the tubular extension 56 so that the turns of the spring 20 may envelop the magnetic ring 70 without encountering any projecting surface between the ring 70 and the extension 56. By way of illustration, the outer diameter of the magnetic ring 70 is .575 inch and the inner diameter of the spring 20, when in a relaxed state, is 0.580 inch so that the turns of the spring 20 closely envelop the magnetic ring 70 without placing a drag thereon when the spring 20 is in the relaxed state. It should also be noted that the spring 20 has a length (as measured in an axial direction) which extends from the secured end in sleeve 58 to a point which lies within the plane of the washer 50, and the free end of the spring 20 lies within the hole 74 of the washer 50. The magnetic ring 70 has a length (as measured in an axial direction) which extends from the sleeve 58 to a point which lies in the plane of the washer 50 but which point is located slightly beyond the free end of the spring 20.

Figure 2:
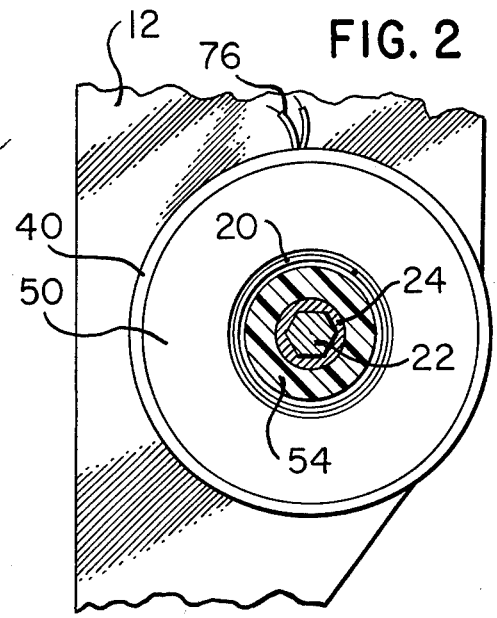
FIG. 2 is an end view, partly in cross section, which is taken along the line 2—2 of FIG. 1 to show additional details of the clutch.

The clutch 10 (FIGS. 1 and 2) operates in the following manner. When the motor 28 is energized, its output pulley 30 will rotate the driving member means 14 at a constant velocity via pulley 26. Because the clutch spring 20 is fixed to rotate with the tubular shaft 24, the spring 20 will also rotate when the driving shaft 22 and the tubular shaft 24 rotate. In the embodiment shown, the shaft 22 rotates at 400 RPM. When the coil 46 is not energized, the output member means 16 will remain stationary while the driving member means 14 rotates because, at this time, the spring 20 loosely surrounds the magnetic ring 70. When the clutch 10 is to be actuated, the leads 76 of the coil 46 are connected to a source of DC potential, producing a magnetic flux which causes the spring 20 to wrap tightly around the magnetic ring 70 to couple the output member 54 to the driving member means 14 to rotate therewith. The spring 20 is of that variety which is commonly referred to as the wrap-down type in that it is wound in a direction such that a drag on the free end of the spring 20 causes it to wrap tightly around the magnetic ring 70. In the embodiment shown, the free end of the spring 20 drags on the inside diameter of the washer 50 to produce the frictional drag thereon. When the coil 46 is deenergized, the spring 20 relaxes to uncouple the clutch 10.

The construction described enables the clutch 10 to have an improved magnetic flux pattern and enables the clutch to be produced at low cost compared to prior art clutches. When the coil 46 is energized, a flux pattern, as shown by the closed line 78 in FIG. 1 is generated. The flux pattern 78 passes through the housing 40, the clutch spring 20, the floating magnetic ring 70, and the washer 50. The term floating magnetic ring, as defined herein, means that the elements surrounding the magnetic ring 70 are made of nonferrous materials so as to concentrate the magnetic flux in the magnetic ring 70 and the spring 20. This flux pattern 78 causes the spring 20 to grip the magnetic ring 70 over the entire axial length of the ring 70 causing a faster response time for clutch 10 when compared to prior art clutches. When the coil 46 is energized, the free end of the spring 20 which lies in the hole 74 (which hole acts as a magnetic gap) is attracted to the washer 50 to retard the free end of the spring 20 and thereby initiate the winding down of the spring 20 on the magnetic ring 70 to provide the coupling between the driving member means 14 and the output member means 16. When the coil 46 is deenergized, the spring 20 relaxes to disconnect the output member means 16 from the driving member means 14 which continues to rotate while the motor 28 is energized. The output member 54 may have a helical thread 80 (FIG. 1) or cams (not shown) to transfer the motion of the clutch 10 to a utilization device (not shown) with which the clutch 10 may be used.

Figure 3:
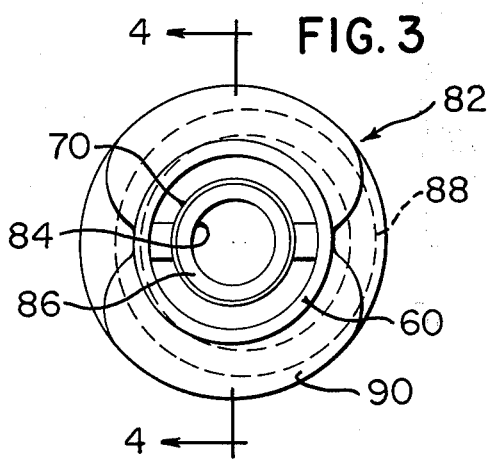
FIG. 3 is an end view of another embodiment of the output member means which may be used with the clutch shown in FIG. 1.
Figure 4:
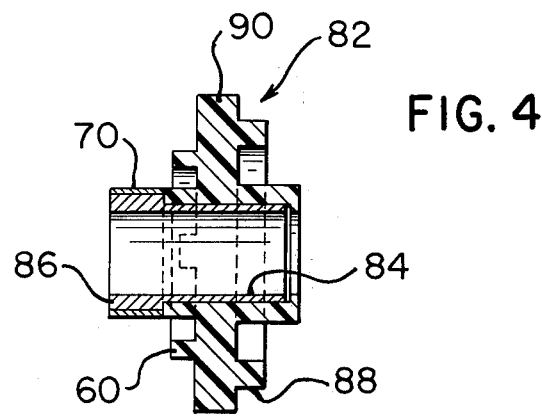
FIG. 4 is a cross-sectional view, taken along the line 4—4 of FIG. 3 to show additional details of the output member means.

FIGS. 3 and 4 show another embodiment of the output member means 82 which may be used in the clutch 10. The output member 82 is made of a plastic material as previously described, and is substantially identical to output member 54 except that it has a nonferrous bearing 84 for rotatably mounting the tubular shaft 24 therein. The bearing 84 is fixed to rotate with the output member 82 by any conventional technique such as cementing. The output member 82 has a thickened area 86 near the end thereof which abuts against the sleeve 58 (FIG. 1), and the floating magnetic ring 70 is fixed thereto as by plating as previously described. A projecting annular rim 60 is also located on the output member 82 for the same purpose for which annular rim 60 on output member 54 was used. A cam 88 on the output member 82 illustrates an alternative structure by which the output member 82 of the clutch 10 may be connected to a utilization device like a paper feed mechanism on a printer. The output member 82 also has thereon a twin lobed cam 90 which may be used in conjunction with a follower arm to be described in conjunction with the embodiment of the output member 92 shown in FIGS. 5 and 6.

The output member 92 (FIGS. 5 and 6) is generally similar to the output member 54 shown in FIG. 1 and has the same annular rim 60 and threads 80 as does output member 54. When mounted in the clutch 10, the tubular shaft 24 thereof is rotatably mounted in the mounting hole 94 of the output member 92 which is made of plastic material as previously described. The end 96 of the output member 92 has opposed keys 98 formed thereon to fit into complementary recesses in a magnetic ring 100 which performs the same function as the magnetic ring 70 in FIG. 1. Nickel is a good material for the magnetic rings 70 and 100 in that it has a high coefficient of friction when it is in a magnetized state and a lower coefficient of friction when it is in a demagnetized state. Accordingly, the use of nickel in rings 70 and 100 and the improved flux pattern described facilitate a rapid and consistent response by the clutch 10 in coupling and uncoupling the driving member means 14 and output members 54, 82 and 92. As an illustration, clutch 10, in one embodiment thereof, takes about 11 milliseconds, ± 1 millisecond, to be actuated, whereas at least one of the prior art clutches referred too takes about 18 milliseconds, ± 6 milliseconds, to be actuated or to become coupled.

Figure 5:
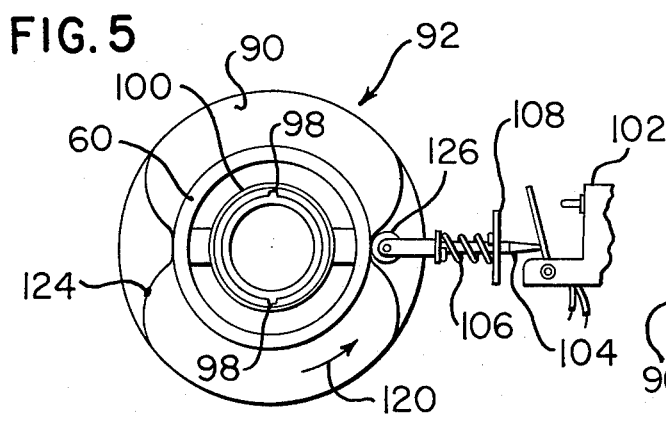
FIG. 5 is an end view of another embodiment of the output member means which may be used with the clutch shown in FIG. 1.
Figure 6:
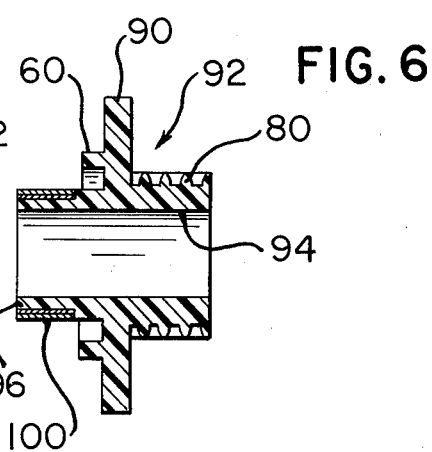
FIG. 6 is a cross-sectional view, taken along the line 6—6 of FIG. 5 to show additional details of the output member means.

In some situations, it may be desireable to add a monitoring switch means to the clutch 10 to shut off the energizing current to the coil 46 when accurate positioning by the clutch 10 is desired. This may be accomplished by a normally-open, monitoring switch 102, shown in FIG. 5. The switch 102 is actuated by a follower arm 104 which is resiliently biased into engagement with the periphery of a twin lobed cam 90 by a spring 106 which abuts against a support member 108 of the frame means 12. When the follower arm 104 is on one of the low points of the cam 90 as shown in FIG. 5, the switch 102 is open.

Figure 7:
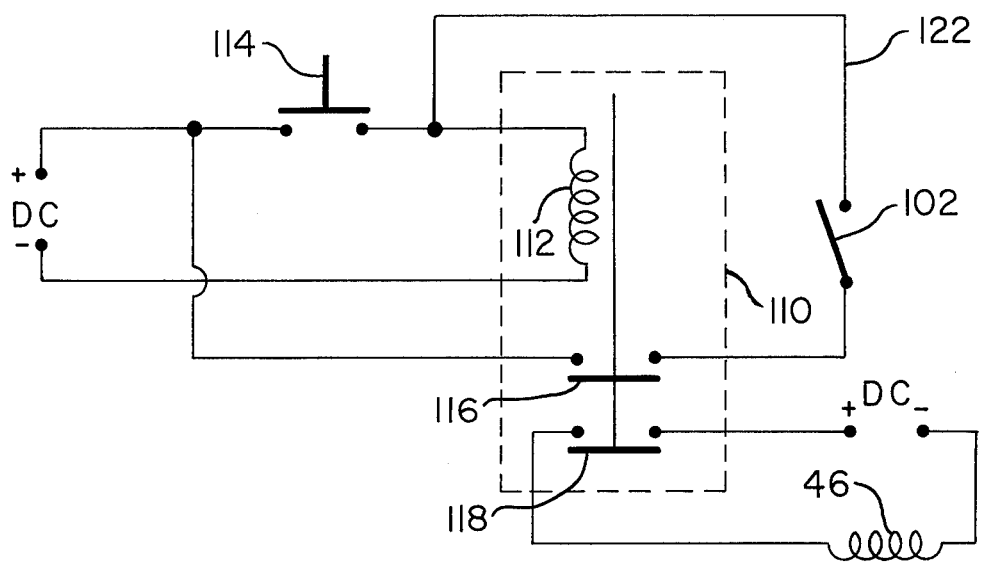
FIG. 7 is a schematic view showing a control circuit which may be used with the clutch of this invention to facilitate accurate positioning of the clutch.

The switch 102 may be part of any conventional energizing circuit; however, for ease of illustration, a simple, relay-type circuit is shown in FIG. 7. In FIG. 7, there is shown a relay 110 whose coil 112 is connected to a source of DC potential by a start switch 114. The switch 114 may be a conventional manual, push-button type switch which remains closed when actuated for about 30 to 40 milliseconds for the example shown, or it may be controlled by a central processing unit (CPU) (not shown) which is part of a machine in which the clutch 10 is used. As soon as switch 114 is closed, the normally-open contacts 116 and 118 of the relay 110 will close. The closing of contacts 118 will connect the coil 46 to a source of D.C. potential to thereby energize the coil 46 of the clutch 10, causing the output member 92 (FIG. 5) thereof to rotate in the direction of arrow 120. In the embodiment of the clutch 10 described, it was stated that the clutch 10 has an actuation time of about 11 milliseconds and therefore, a time delay or time constant of 30 to 40 milliseconds associated with switch 114 would provide ample time for the follower arm 104 to rise on one of the lobes of the cam 90 to enable it to close switch 102 (FIGS. 5 and 7) associated therewith. The closing of switch 102 in conjunction with the now-closed contacts 116 of relay 110 provide a holding circuit 122 for relay 110 enabling coil 46 to remain energized as the output member 92 rotates in the direction of arrow 120 and switch 114 opens. Later, after approximately 153 to 175 degrees of rotation of the output member 92, the follower arm 104 contacts a point 124 on cam 90 causing switch 102 to open. Upon the opening of switch 102, the holding circuit 122 associated with relay 110 will open, and the relay 110 will be deenergized causing its contacts 116 and 118 to open, thereby deenergizing coil 46 of the clutch 10 to uncouple the output member 92 from the constantly rotating driving member means 14. Point 124 is located on cam 90 so as to enable the switch 102 to open at an angle of rotation of the output member 92 which angle represents a position where the load on the clutch 10 is approaching its minimum to thereby facilitate the uncoupling of the clutch 10 and the accurate positioning of the output members 92, 82 and 54 thereof. In this regard, as the load on the clutch is approaching a minimum, the spring 106 on the follower arm 104 which pushes the roller 126 into engagement with the cam 90 causes the output member 92 to be speeded up slightly in the direction of arrow 120 when the roller 126 approaches the area of point 124, thereby causing the clutch spring 20 to relax somewhat from its "wrapped down" or driving condition to facilitate the uncoupling of clutch spring 20 from the output member 92. Naturally, the specific times, angles of rotation of cam 90, and design of cam 90 are merely illustrative of one emembodiment of the clutch 10 of this invention, and these factors may be altered by conventional design techniques to adapt the clutch 10 to a particular application or use. Several clutches similar to clutch 10 may be operated from one driving shaft 22 by simply passing the shaft 22 through the tubular shafts 24 of the additional clutches 10 which may be positioned in side by side relationship.

What is claimed is:

1. In a magnetic spring clutch having a driving member means; a coil means, an output member means, and a helical clutch spring having one end fixed to said driving member means to rotate therewith; the improvement comprising:

a floating magnetic ring fixed to said output member means with said magnetic ring being at least partially surrounded by said clutch spring;

said coil means when energized having a magnetic flux path which passes through said clutch spring and said magnetic ring so as to cause said clutch spring to tighten on said magnetic ring to provide a driving connection between said driving member means and said output member means.

2. The clutch as claimed in claim 1 in which said driving member means and said output member means are made of nonmagnetic material.

3. The clutch as claimed in claim 2 in which said magnetic ring is made of a magnetic material which is very thin in thickness in relation to its outer diameter.

4. The clutch as claimed in claim 3 in which said magnetic ring has a high coefficient of friction when in the magnetized state and a lower coefficient of friction when in the non-magnetized state.

5. The clutch as claimed in claim 3 in which said output member means is made of a plastic material like acetal resin and said magnetic ring has a thickness of at least 0.001 inch and is made of a material like nickel.

6. The clutch as claimed in claim 1 in which said driving member means and said output member means are axially aligned with each other for rotation on a common axis of rotation:

said clutch spring and said floating magnetic ring each having an axis of rotation which is coincident with said common axis;

said coil means including an annular coil whose longitudinal axis is coincident with said common axis;

said magnetic flux path of the coil means having a magnetic gap therein;

said clutch spring having a free end which is positioned in said magnetic gap; and said magnetic ring having a length as measured in an axial direction so as to enable an end thereof to extend into said magnetic gap.

7. The clutch as claimed in claim 1 in which said output member means has switch monitoring means connected thereto so as to deenergize said coil means at a predetermined point in the rotation of said output member means.

8. A magnetic spring clutch comprising:

a frame means;

a nonmagnetic driving member rotatably supported in said frame means on an axis of rotation and means for rotating said driving member;

a nonmagnetic output member means rotatably supported on a portion of said driving member for rotation on said axis and having a magnetic ring fixed thereto for concentric rotation relative to said driving member;

a helical clutch spring at least partially encircling said magnetic ring and having one end fixed to said driving member, and also having a free end;

a coil means fixed to said frame means in concentric relationship with said helical clutch spring, and said coil means when energized having a magnetic flux path which passes through said magnetic ring and said clutch spring so as to attract said free end towards said coil means so as to cause said clutch spring to tighten on said magnetic ring to provide a driving connection between said driving member and said output member means.

9. The clutch as claimed in claim 8 in which said output member means is completely made of a plastic material like acetal resin and said magnetic ring is fixed thereto for rotation therewith.

10. The clutch as claimed in claim 8 in which said output member means has a nonferrous bearing fixed thereto to rotate therewith, and with said bearing being rotatably mounted on said portion of said driving member; said magnetic ring being fixed to a portion of said bearing to rotate therewith.

11. The clutch as claimed in claim 10 in which said magnetic ring includes ferrous material.

12. The clutch as claimed in claim 8 in which said magnetic ring is made of nickel.

13. The clutch as claimed in claim 8 in which said output member means has switch monitoring means connected thereto so as to deenergize said coil means at a predetermined point in the rotation of said output member means.

* * * * *